United States Patent [19]

Matsunaga

[11] Patent Number: 5,224,063
[45] Date of Patent: Jun. 29, 1993

[54] ADDRESS TRANSLATION IN FFT NUMERICAL DATA PROCESSOR

[75] Inventor: Mitsuhiro Matsunaga, Tokyo, Japan

[73] Assignee: NEC Corporation, Tokyo, Japan

[21] Appl. No.: 707,113

[22] Filed: May 28, 1991

[30] Foreign Application Priority Data

May 28, 1990 [JP] Japan ................................ 2-139361

[51] Int. Cl.$^5$ ............................................. G06F 15/332
[52] U.S. Cl. .................................................. 364/726
[58] Field of Search ......................................... 364/726

[56] References Cited

U.S. PATENT DOCUMENTS

| 3,584,782 | 6/1971 | Bergland | 364/226 |
| 3,731,284 | 5/1973 | Thies | 364/726 |
| 3,777,131 | 12/1973 | Llewellyn | 364/726 |
| 4,393,457 | 7/1983 | New | 364/726 |
| 4,477,878 | 10/1984 | Cope | 364/726 |
| 4,630,229 | 12/1986 | D'Hondt | 364/726 |
| 4,689,762 | 8/1987 | Thibodeau, Jr. | 364/726 |

Primary Examiner—David H. Malzahn
Attorney, Agent, or Firm—Whitham & Marhoefer

[57] ABSTRACT

A numerical data processor includes first and second registers for receiving and holding input data from a memory, respectively, and a multiplier receiving the input data held in the first and second registers for multiplying the input data held in the first register by the input data held in the second register. A translated address generation circuit is coupled to the memory for generating a translation address of two bits for translation of an address of the input data to be supplied to the register, and an addition/integration circuit receives an output of the multiplier for performing an addition/integration of the output of the multiplier. A controller operates to control the memory, the registers and the translated address generation circuit in a programmed manner so that a Fourier transform, is executed for a given data.

2 Claims, 3 Drawing Sheets

ADDRESS TRANSLATION IN FFT NUMERICAL DATA PROCESSOR

BACKGROUND OF THE INVENTION

1. Field of the Invention

The present invention relates to a control LSI (large scaled integrated circuit), and more specifically to a numerical data processor for transferring output data of a multiplier to an adder for Fourier transform.

2. Description of Related Art

Conventional numerical data processors have been such that, for fast Fourier transform (called "FFT" hereinafter), output data of a multiplier is transferred to an adder by means of a transfer instruction in software. In the FFT, furthermore, when an address of data in a butterfly operation is rearranged, a translated address has been generated by performing a bit inversion from a most significant bit (MSB) to a least significant bit (LSB) in a software manner.

In the above mentioned conventional numerical data processors, when the FFT is carried out, since the address translation of the data has been performed in the software manner, the base number is 2 in ordinary cases.

The following is a basic algorithm of the butterfly operation in the FFT having the base number of 2:

$$D0 = D0 + W0 \times D1$$

$$D1 = D0 - W0 \times D1$$

where W0 is a rotational factor when 360° is halved.

In the FFT having the base number of 2, therefore, the number of butterfly operations can be expressed as follows because of restriction in algorithm:

(number of data)/2 × log$_2$ (number of data)

Accordingly, the arithmetic operation needs a considerable time. In this connection, even if a base number larger than 2 is used, since the address rearrangement of the data has been performed in the software manner, necessary processing becomes too complicated, and therefore, the operation speed cannot be improved.

SUMMARY OF THE INVENTION

Accordingly, it is an object of the present invention to provide a numerical data processor which has overcome the above mentioned defect of the conventional one.

Another object of the present invention is to provide a numerical data processor capable of shortening a time required for arithmetic operation in the FFT.

The above and other objects of the present invention are achieved in accordance with the present invention by a numerical data processor including first and second registers for input data, respectively, a multiplier receiving the input data held in the first and second registers for multiplying the input data held in the first register by the input data held in the second register, a translated address generation circuit for generating a translated address of two bits for translation of an address of the input data, and an addition/integration circuit receiving an output of the multiplier for performing an addition/integration of the output of the multiplier for Fourier transform.

In addition to the translated address generation circuit for generating the translation address of two bits for the address translation, another translated address generation circuit for generating a translation address of one bit can be provided.

With the above mentioned numerical data processor, when the butterfly operation is completed, the order of data items is rearranged in order to line up the data items. For example, assuming that data is "a"$\times 4^n$+"b"$\times 4^{(n-1)}$+ ... +"d"$\times 4^1$+"e"$\times 4^0$, the data is exchanged in units of two bits in address to "e"$\times 4^n$+"d"$\times 4^{(n-1)}$+ ... +"b"$\times 4^1$+"a"$\times 4^0$ in such an ordered manner that a high place bit is put in a low place and a low place bit is put in a high place.

As mentioned above, the translated address generation for the FFT can be modified to comply with the base numbers "2" and "4". Therefore, if the number of data is expressed by $4^n \times 2^m$, the number of required operations can be reduced from (number of data)/2 × log$_2$ (number of data)

to $4^n/4 \times \log_4 (4^n) + 2^m/2 \times \log_2 (2^m)$.

Therefore, the processing can be speeded up, and the processing time can be shortened.

The above and other objects, features and advantages of the present invention will be apparent from the following description of preferred embodiments of the invention with reference to the accompanying drawings.

DESCRIPTION OF THE PREFERRED EMBODIMENTS

Figure 1:
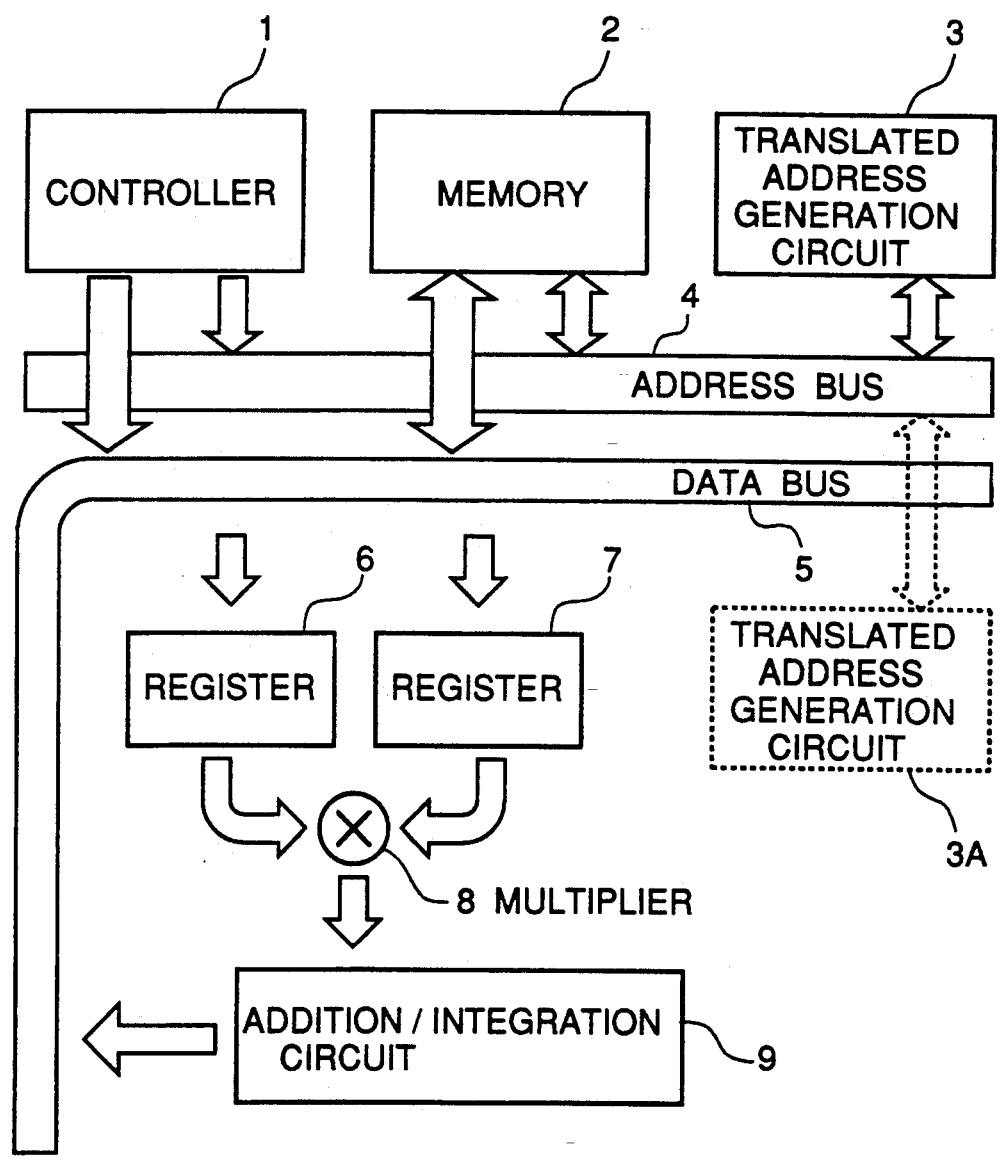
FIG. 1 is a logic block diagram of a butterfly operation circuit in one embodiment of the numerical data processor in accordance with the present invention.

Referring to FIG. 1, the shown embodiment of the numerical data processor includes a controller 1 for controlling arithmetic and logic operations, and a memory 2 for holding operation data. Each of the controller 1 and the memory 2 is coupled to an address bus 4 and a data bus 5. In addition, a pair of registers 6 and 7 are coupled to the data bus 5 so as to hold input data, respective, and a multiplier 8 is coupled to the pair of registers 6 and 7 for multiplying the data held in the register 6 by the data held in the register 7.

Furthermore, a translated address generating circuit 3 is coupled through the address bus 4 to the controller 1 and the memory 2. This translated address generating circuit 3 generates an address translated in units of two bits for an address translation of the data. An addition-/integration circuit 9 is connected to receive the output of the multiplier 8, so that a result of multiplication outputted by the multiplier 8 is subjected to an addition-/integration processing, for the Fourier transform. The additional/integration circuit 9 is connected through the data bus 5 to the controller 1 and the memory 2, In addition to the translated address generating circuit 3, another translated address generating circuit 3A for generating an address translated in units of one bit may be provided, as shown in dotted lines in FIG. 1.

As mentioned above, the controller 1 operates to control the arithmetic and logic operations, and the memory 2 operates to hold operation data. The translated address generation circuit 3 generates a translated address used for rearranging operation data in the memory 2 for the FFT butterfly operation.

The address bus 4 transfers an address for the operation data from the controller 1 to the memory 2. In addition, and address of the operation data is sent and received through the address bus 4 between the memory 2 and the translated address generation circuit 3 under control of the controller 1. The data bus 5 is used to send and receive the operation data between the memory 1, the registers 6 and 7 and the addition/integration circuit 9 under control of the controller 1.

The pair of registers 6 and 7 hold a pair of input data for the multiplier 8, and the multiplier 8 operates to perform multiplication between the pair of input data held in the pair of registers 6 and 7. A result of multiplication is supplied from the multiplier 8 to the addition-/integration circuit 9, so that a result of addition/integration processing for the multiplication result is outputted to the data bus 5. A data precision of the addition/integration circuit 9 is (data precision of the register 6)+(data precision of the register 7)+4 bits. In addition, the addition/integration circuit 9 has a reset function.

Figure 4:
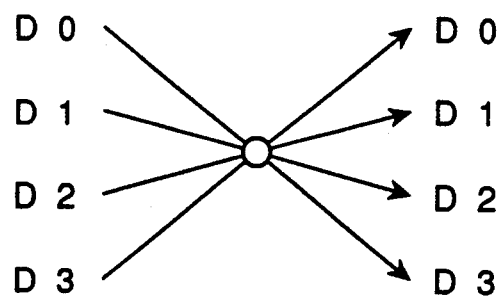
FIG. 4 illustrates one unit algorithm of the butterfly operation in the FFT having the base number of 4, in the case of the first embodiment of the present invention.

Referring to FIG. 4, there is shown a basic algorithm of the FFT butterfly operation with the base number of 4, in order to realize the numerical data processor in accordance with the present invention. This algorithm can be shown as the following equation:

$$D0 = W0 \times D0 + W0 \times D1 + W0 \times D2 + W0 \times D3$$

$$D1 = W0 \times D0 + W1 \times D1 + W2 \times D2 + W3 \times D3$$

$$D2 = W0 \times D0 + W2 \times D1 + W4 \times D2 + W6 \times D3$$

$$D3 = W0 \times D0 + W3 \times D1 + W6 \times D2 + W9 \times D3$$

where W0, W1, W2, W3, W4, W6, W9 are rotational factors when 360° is divided into four equal parts, and W0=W4, W1=W9, and W2=W6.

In addition, the above equation shows that the butterfly operation is an operation repeating a unitary operation in which addition is performed after multiplication.

Figure 5:
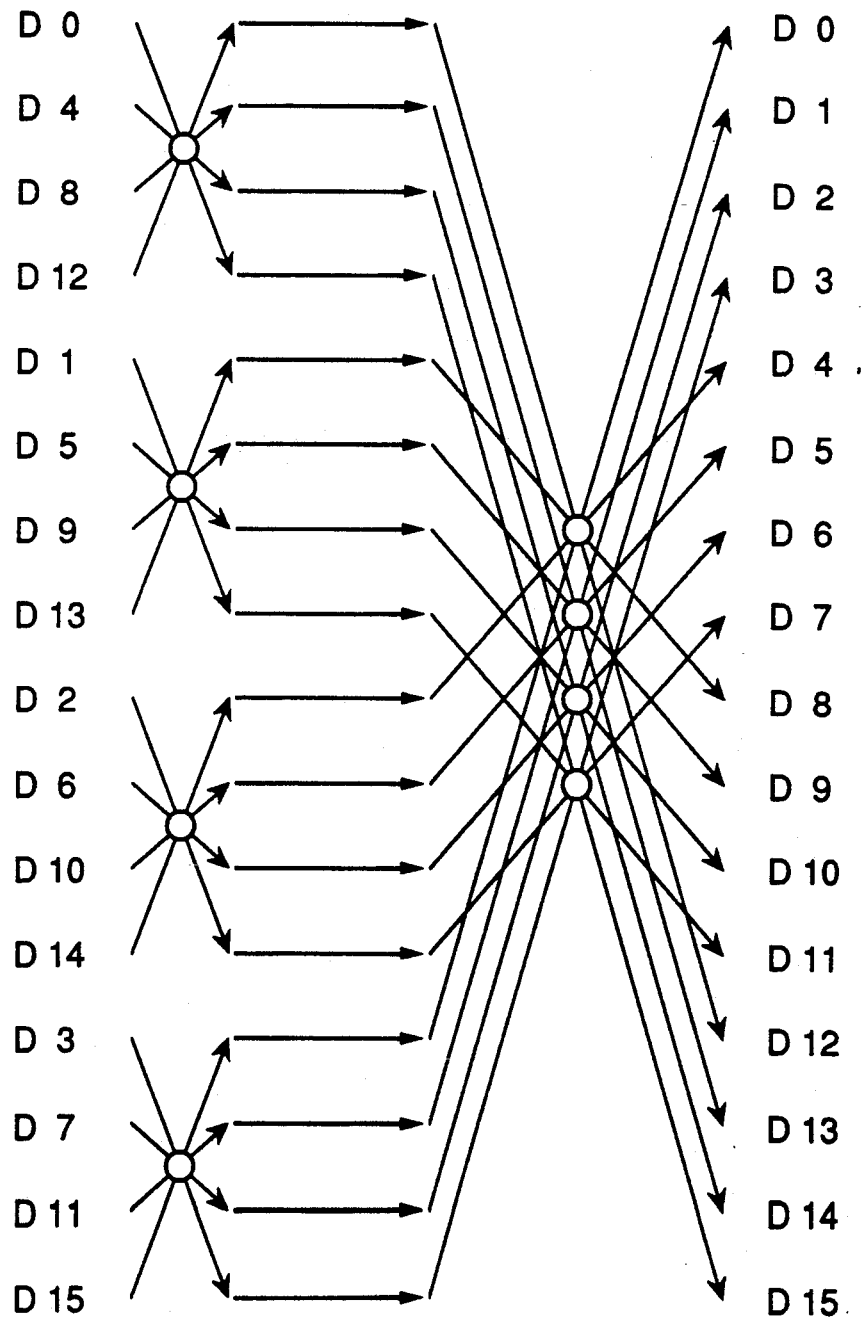
FIG. 5 illustrates an algorithm of the butterfly operation for 16 items of data in the FFT having the base number of 4, in the case of the first embodiment of the present invention.

Referring to FIG. 5, there is shown an algorithm of the FFT having the base number "4", for 16 items of data. It will be seen from FIG. 5 that the order of the input data is not consistent with the order of the output data. In the case that the FFT having the base number "4" is executed for the 16 items of data, the butterfly operation is a second-order butterfly operation in which the first-order butterfly operation is performed four times.

Figure 2:
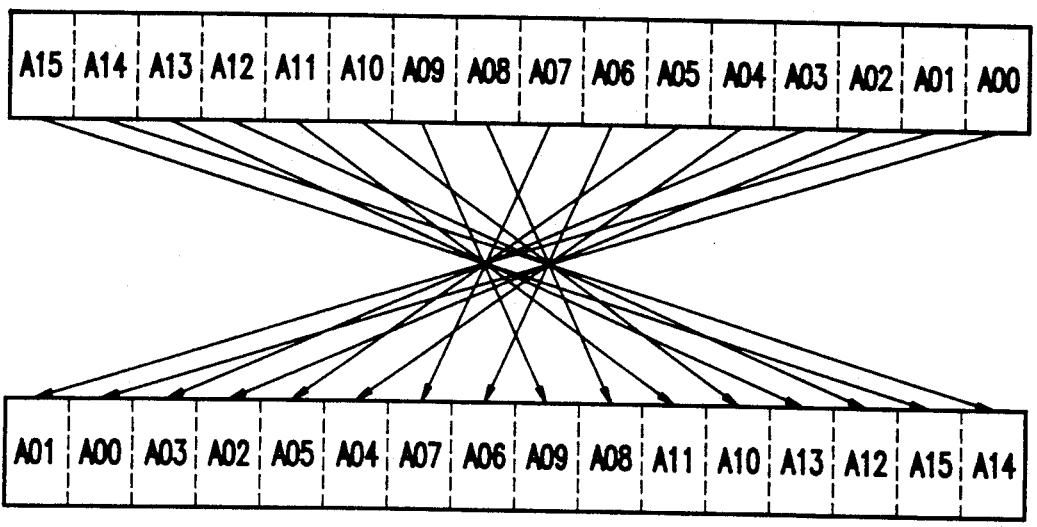
FIG. 2 illustrates an address translation method performed in the translated address generation circuit shown in FIG. 1 for rearranging numerical data in the FFT having the base number of 4.

Turning to FIG. 2, there is illustrated an address translation method performed in the translated address generation circuit 3 for rearrangement of the operation data in the FFT having the base number "4". The translated address generation circuit 3 generates addresses for performing the rearrangement of the order of the data so that when the FFT butterfly operation is completed, the arrangement of the data will be in order. In order to ensure that when the FFT having the base number "4" is executed, the arrangement of the data will be in order after the butterfly operation, assuming that an original data address is expressed by "a"$\times 4^n$+"b"$\times 4^{(n-1)}$+ . . . +"d"$\times 4^1$+"e"$\times 4^0$, it is necessary to exchange the data to an address expressed by "e"$\times 4^n$+"d"$\times 4^{(n-1)}$+ . . . +"b"$\times 4^1$+"a"$\times 4^0$. For this purpose, the data is modified in such a manner that high place bits and low place bits are exchanged with each other in units of two bits.

Thus, the first embodiment as mentioned above operates as follows: Before the butterfly operation, the rearrangement of the operation data in the memory 2 is executed on the basis of the translation result of the translated address generation circuit 3. Then, one stage of the unit butterfly operation based on the basic FFT algorithm having the base number "4" as shown in FIG. 4 is executed by the registers 6 and 7, the multiplier 8 and the addition/integration circuit 9. At each time the one stage of the unit butterfly operation has been executed, the result of the operation is transferred to the memory 2.

As seen from the above, the butterfly operation can be completed in (number of data)/4$\times \log_4$ (number of data).

Figure 3:
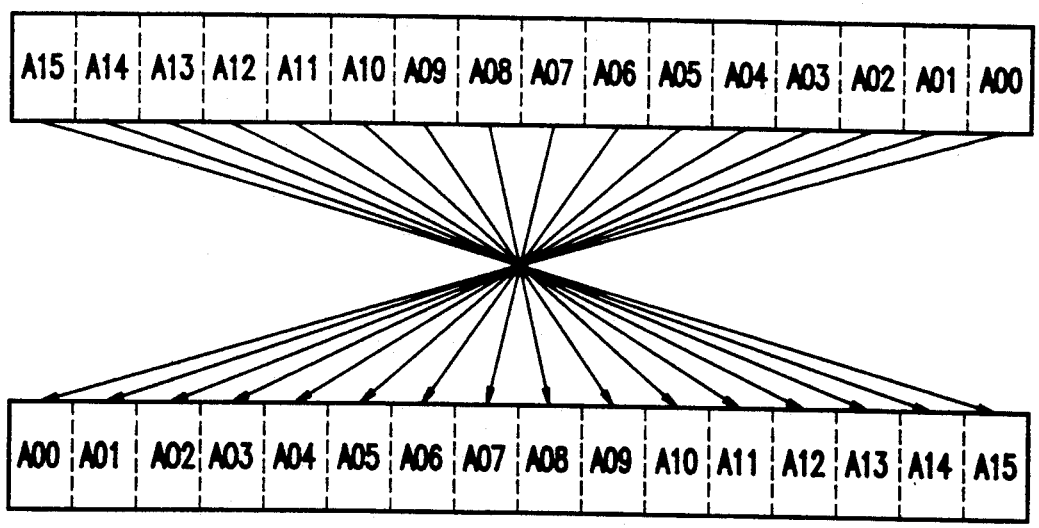
FIG. 3 illustrates an address translation method performed in the translated address generation circuit shown in FIG. 1 for rearranging numerical data in the FFT having the base number of 2.

Turning to FIG. 3, there is illustrated an address translation method performed in the translated address generation circuit 3A for rearrangement of the operation data in the FFT having the base number "2".

In the second embodiment, the translated address generation circuit 3 generates addresses for performing the rearrangement of the order of the data for the FFT of the base number "4" so that when the butterfly operation in the FFT of the base number "4" is completed, the arrangement of the data will be in order, and the translated address generation circuit 3A generates addresses for performing the rearrangement of the order of the data for the FFT of the base number "2" so that when the butterfly operation in the FFT of the base number "2" is completed, the arrangement of the data will be in order. This is a second embodiment of the present invention. In the case of the FFT having the base number "2", assuming that an original data address is expressed by "a"$\times 2^n$+"b"$\times 2^{(n-1)}$+. . . +"d"$\times 2^1$+"e"$\times 2^0$, it is necessary to exchange the data to an address expressed by "e"$\times 2^n$+"d"$\times 2^{(n-1)}$+. . . +"b"$\times 2^1$+"a"$\times 2^0$.

In the second embodiment, after the FFT of the base number "4" has been completed by using the translated address generation circuit 3, the FFT of the base number "2" is executed by using the translated address generation circuit 3A, similarly to the FFT of the base number "4".

Incidentally, the numerical data processor shown in FIG. 1 can execute the FFT of the base number "2" without modification by using only the translated address generation circuit 3A.

If the number of data is $4^n$, the first embodiment can reduce the number of the butterfly operations to $4^n/4 \times \log_4 4^n$, and therefore, can increase the operation speed. However, the number of data is limited to $4^n$. In the second embodiment, on the other hand, after the FFT of the base number "4" has been completed, the FFT of the base number "2" is executed. Therefore, it is possible to execute the FFT having the number of data of $4^n \times 2^m$. In this case, the number of the butterfly operation can be reduced to $4^n/4 \times \log_4 4^n + 2^m/2 \times \log_2 2^m$. In other words, it is possible to increase the number of data which can be processed, and to elevate the processing speed.

As seen from the above, differently from the conventional numerical data processor in which the translated address generation for the FFT is limited to the base number "2", the numerical data processor in accordance with the present invention comprises a hardware for the translated address generation corresponding to the base number "2" and a hardware for the translated address generation corresponding to the base number "4". With this provision, the processing can be speeded up, and the processing time can be shortened.

The invention has thus been shown and described with reference to the specific embodiments. However, it should be noted that the present invention is in no way limited to the details of the illustrated structures but changes and modifications may be made within the scope of the appended claims.

I claim:

1. A fast Fourier transform (FFT) numerical data processor comprising memory means for holding $4^n$ data at a plurality of addresses, an address bus and a data bus connected to said memory means for reading data out of and writing data into said memory means at said plurality of addresses, first and second registers connected to said data bus for receiving and holding data from said memory means, multiplier means for receiving said data held in said first and second registers and for multiplying said data held in said first register by said data held in said second register, addition/integration means for receiving an output from said multiplier means and for performing an addition/integration of the output of the multiplier means, said addition/integration means having an output connected to said data bus so that a result is transferred to said memory means, translated address generation means coupled to the address bus for generating a translation address corresponding to the base number 4 for translation of an address of the data to be supplied to said first and second registers from said memory means, and controller means for controlling said memory means, said first and second registers and the translated address generating means in a programmed manner so that a fast Fourier transform is executed by performing $4^n/4 \times \log_4 4^n$ butterfly operations.

2. A fast Fourier transform (FFT) numerical data processor comprising memory means for holding $4^n \times 2^m$ data at a plurality of addresses, an address bus and a data bus connected to said memory means for reading data out of and writing data into said memory means at said plurality of addresses, first and second registers connected to said data bus for receiving and holding data from said memory means, multiplier means for receiving said data held in said first and second registers and for multiplying said data held in said first register by said data held in said second register, addition/integration means for receiving an output from said multiplier means and for performing an addition/integration of the output of the multiplier means, said addition/integration means having an output connected to said data bus so that a result is transferred to said memory means, first translated address generation means coupled to the address bus for generating a translation address corresponding to the base number 4 for translation of an address of the data to be supplied to said first and second registers from said memory means, second translated address generating means coupled to the address bus for generating a translation address corresponding to the base number 2 for translation of an address of the input data to be supplied to said first and second register means from said memory means, and controller means for controlling said memory means, said first and second registers and said first and said second translated address generation means in a programmed manner so that a fast Fourier transform is executed by performing $4^n/4 \times \log_4 4^n + 2^m/2 \times \log_2 2^m$ butterfly operations.

* * * * *